(12) United States Patent
Agehara et al.

(10) Patent No.: US 7,534,076 B2
(45) Date of Patent: May 19, 2009

(54) CORE BIT

(75) Inventors: Kigen Agehara, Tokyo (JP); Michio Yamashita, Tokyo (JP); Naohide Murakami, Tokyo (JP)

(73) Assignee: Max Co., Ltd., Tokyo (JP)

( * ) Notice: Subject to any disclaimer, the term of this patent is extended or adjusted under 35 U.S.C. 154(b) by 526 days.

(21) Appl. No.: 10/528,233

(22) PCT Filed: Sep. 8, 2003

(86) PCT No.: PCT/JP03/11432

§ 371 (c)(1),
(2), (4) Date: Mar. 18, 2005

(87) PCT Pub. No.: WO2004/026513

PCT Pub. Date: Apr. 1, 2004

(65) Prior Publication Data

US 2005/0260048 A1 Nov. 24, 2005

(30) Foreign Application Priority Data

Sep. 20, 2002 (JP) .............................. 2002-275427

(51) Int. Cl.
*B25D 17/08* (2006.01)
*B28D 1/14* (2006.01)
(52) U.S. Cl. .................... 408/204; 408/226; 175/403
(58) Field of Classification Search .......... 408/204–209, 408/238, 239 R, 703, 226; 125/20; 175/405, 175/403; *B23B 51/04, 51/05; B25D 17/08; B28D 1/14*
See application file for complete search history.

(56) References Cited

U.S. PATENT DOCUMENTS 3,592,554 A * 7/1971 Takahara .................... 408/204
3,817,648 A * 6/1974 Miller ......................... 408/59
5,174,696 A * 12/1992 Bogner ........................ 408/206
5,253,961 A * 10/1993 Geissler ....................... 408/58
6,176,655 B1 1/2001 Ostermeier et al.
6,382,202 B2 * 5/2002 Chau-Ngoc et al. ........... 125/20

FOREIGN PATENT DOCUMENTS

| CN | 1229706 A | | 9/1999 |
|---|---|---|---|
| DE | 3446296 A1 | * | 6/1986 |
| JP | 49-40868 Y | | 11/1974 |
| JP | 54-22281 U | | 2/1979 |
| JP | 56-42834 U | | 4/1981 |
| JP | 3-130338 U | | 12/1991 |
| JP | 08090325 A | * | 4/1996 |
| JP | 11-309710 A | | 11/1999 |
| JP | 2002337133 A | * | 11/2002 |

* cited by examiner

*Primary Examiner*—Daniel W Howell
(74) *Attorney, Agent, or Firm*—Morgan, Lewis & Bockius LLP

(57) ABSTRACT

In a core bit formed with a drill portion in a cylindrical shape formed with a boring blade on one end side thereof and a mounting portion in a cylindrical shape mounted to a chuck portion of a concrete drill on other end side of the drill portion, formed with an engaging portion capable of being engaged with an engaging portion on a side of the chuck portion at an outer peripheral face of the mounting portion for transmitting rotation of a side of the concrete drill via the engaging member, the outer peripheral face of the mounting portion on a side of the boring blade of the engaging member is formed with a flange portion in a shape of a flange having a diameter larger than an outer diameter of the engaging member.

3 Claims, 9 Drawing Sheets

CORE BIT

TECHNICAL FIELD

The present invention relates to a core bit mounted to a concrete drill driven by power of electric power, compressed air or the like and rotated by a rotational force from a side of the concrete drill for boring a concrete wall, a stone member or the like.

BACKGROUND ART

In carrying out a piping construction for a gas supply, a water supply or an air-conditioner at a wall face, a floor face, a foundation or the like of a building formed by concrete, the wall face or the like is bored by using a concrete drill driven by power of electric power, compressed air or the like. By applying rotation and vibration from a side of the concrete drill to a core bit mounted to a chuck portion formed at a front end of the concrete drill, a hole having a predetermined diameter is bored at a concrete wall or the like by a boring blade in a cylindrical shape formed at a front end of the core bit. Various core bits are prepared in accordance with a diameter and a depth of a hole to be bored, and used by being mounted to the chuck portion of the concrete drill in accordance with the diameter of the hole and the thickness of the wall to be bored.

As described in, for example, JP-A-11-309710 (page 3, FIG. 1 and FIG. 2), a core bit of a background art is provided with a cutter ring at a front end of a drill portion having a ring-like supporting member and formed with a portion thereof for being mounted to a concrete drill on an opposed end side, and the mounting portion is formed with a guide portion in a cylindrical shape and a locking portion projected from an outer peripheral face of the guide portion to an outer side in a radius direction. The core bit is mounted to a chuck portion on a side of a tool by the mounting portion to transmit rotation and vibration in an axial direction from the side of the tool to a side of the core bit via the locking portion.

However, according to the above-described core bit of the background art, the locking portions mounted to the chuck portion of the concrete drill for transmitting the rotational force from the concrete drill to the side of the core bit are formed to project to the outer side in the radius direction at equal intervals in a peripheral direction and therefore, there is a case of damaging an outer shape of the locking portion when the core bit is erroneously dropped, or by being brought into contact with other object by vibration or the like in containing or carrying the core bit. When the outer shape of the locking portion is deformed by damage, there is a case in which the core bit cannot be mounted to the chuck portion of the concrete drill or mounted thereto in an incomplete state and the core bit is disengaged from a mounted state in boring operation to be accompanied by a danger. Further, there is a case in which when mounting is incomplete, seal of a cooling water for cooling the cutter ring portion becomes incomplete to leak water from a bonding face of the concrete drill and the core bit.

DISCLOSURE OF THE INVENTION

It is a problem of the invention to resolve the above-described problem of the background art and provide a core bit in which a mounting portion for mounting to a concrete drill and an engaging member for transmitting rotation and vibration are not damaged even when the core bit is dropped or brought into contact with other object by vibration in containing and carrying the core bit and a danger by incompletely mounting the core drill or leakage of cooling water or the like is not brought about.

In order to resolve the above-described problem, a core bit according to the invention is characterized in a core bit formed with a drill portion in a cylindrical shape formed with a boring blade on one end side and a mounting portion in a cylindrical shape mounted to a chuck portion of a concrete drill on other end side of the drill portion and formed with an engaging member capable of being engaged with an engaging portion on a side of the chuck portion at an outer peripheral face of the mounting portion for transmitting rotation on a side of the concrete drill to the core bit via the engaging member, wherein an outer peripheral face of the mounting portion on a side of the boring blade of the engaging member is formed with a flange portion in a shape of a flange having a diameter larger than an outer diameter of the engaging member.

Figure 1:
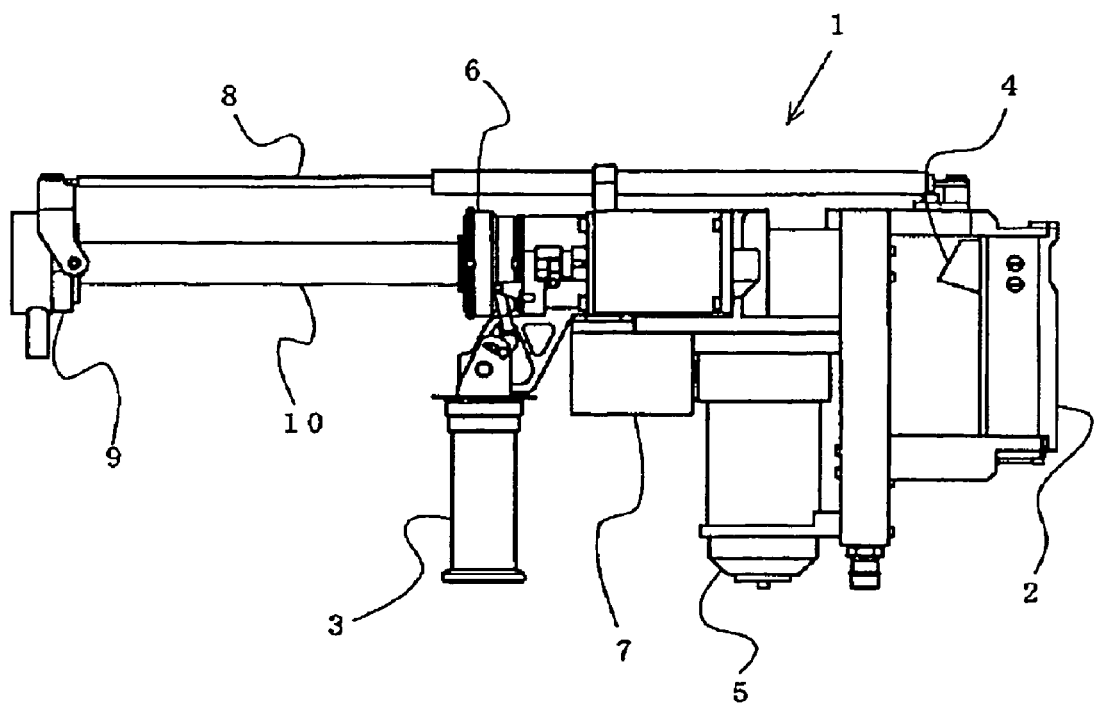
FIG. 1 is a side view of a concrete drill mounted with a core bit according to an embodiment of the invention.

Further, in notations of the drawings, numeral 1 designates a concrete drill, numeral 6 designates a chuck portion, numeral 10 designates a core bit, numeral 11 designated a boring blade, numeral 12 designates a drill portion, numeral 13 designates a mounting portion, numeral 14 designates a guide portion, numeral 15 designates a flange portion, numeral 16 designates an engaging member, numeral 17 designates an engaging projection, numeral 30 designates a core bit, numeral 31 designates amounting portion, numeral 32 designates a locking piece, numeral 34 designates a drill portion, numeral 35 designates a boring blade, and numeral 36 designates a flange portion.

BEST MODE FOR CARRYING OUT THE INVENTION

An explanation will be given of a mode for carrying out the invention based on embodiments shown in the drawings as follows. FIG. 1 is the concrete drill 1 mounted with a core bit according to the invention, and boring operation can be carried out by grabbing a grip 2 formed at a rear end of a main body and a sub grip 3 formed on a front side of the main body by the both hands. By operating a trigger 4 formed at the grip 2, a motor 5 is driven to rotate to rotate the chuck portion 6 to drive to rotate the core bit 10 mounted to the chuck portion 6.

Further, simultaneously therewith, a vibration generating mechanism 7 is driven to vibrate a total of the concrete drill 1 to provide vibration along an axial direction to the core bit 10.

A front end side of the core bit 10 mounted to the chuck portion 6 of the concrete drill 1 is held by a guide member 9 supported by a rod 8 extractable and retractable to and from a front side of the concrete drill 1. Cooling water for cooling a front end portion of the core bit 10 in boring is supplied from a side of the concrete drill 1 to the front end portion of the core bit by way of an opening formed at a center of the core bit 10, and cooling water supplied to the front end portion of the core bit 10 is recovered at the guide member 9 arranged to cover a boring face of a concrete wall face or the like and circulated by way of a filtering apparatus or the like via a hose.

Figure 2:
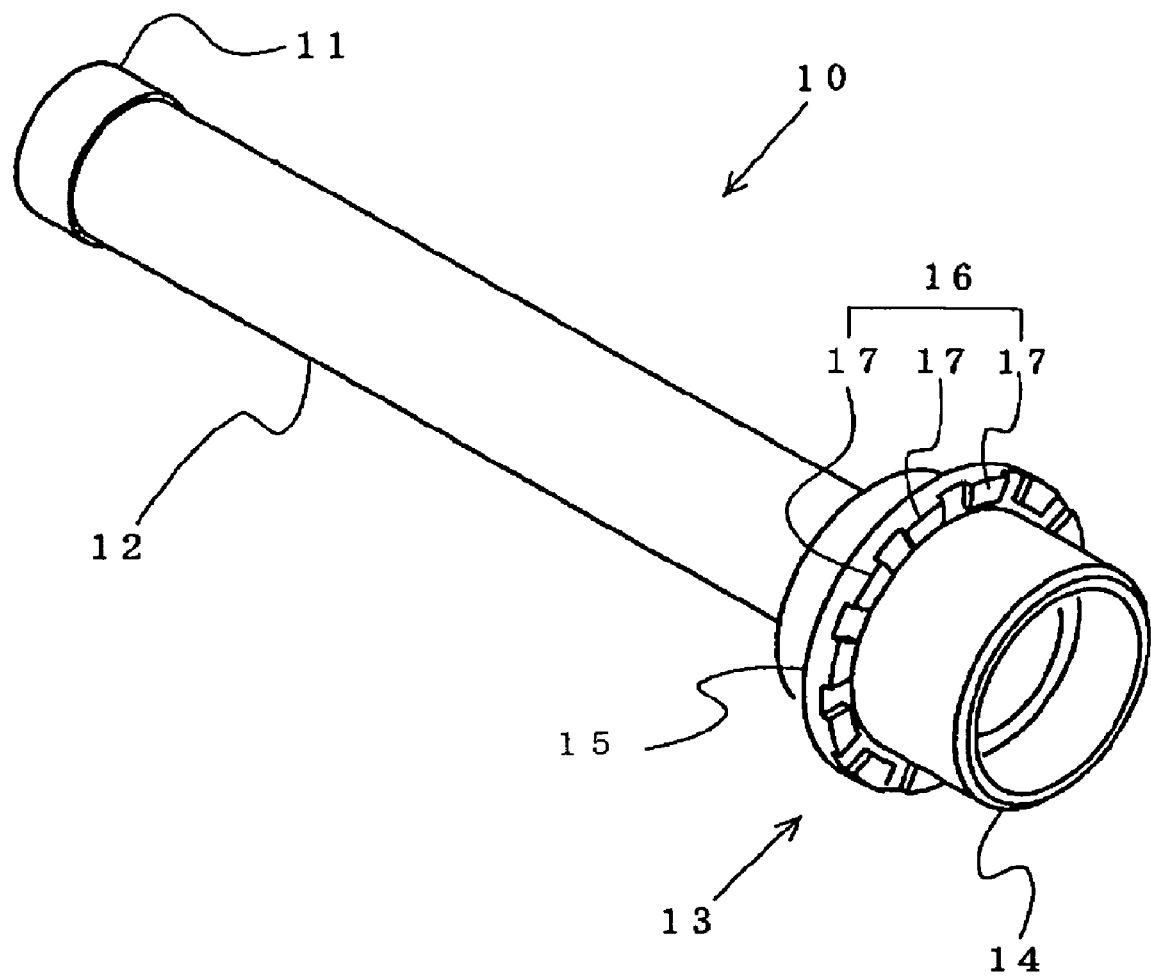
FIG. 2 is a perspective view showing an embodiment of the core bit according to the invention.

As shown in FIG. 2, the core bit 10 is constituted by the drill portion 12 in a shape of a hollow cylinder formed with the boring blade 11 in a cylindrical shape at a front end portion thereof, and the mounting portion 13 in a shape of a hollow cylinder formed at other end side of the drill portion 12, and the drill portion 12 is formed in a dimension and a shape which differ respectively in correspondence with a diameter and a depth of a hole to be bored. An end portion of the mounting portion 13 is formed with the guide portion 14 and by mounting the guide portion 14 in a cylindrical shape to the chuck portion 6 of the concrete drill 1, a rotational axis of the concrete drill 1 and a center axis of the core bit 10 are guided to coincide with each other.

Figure 3:
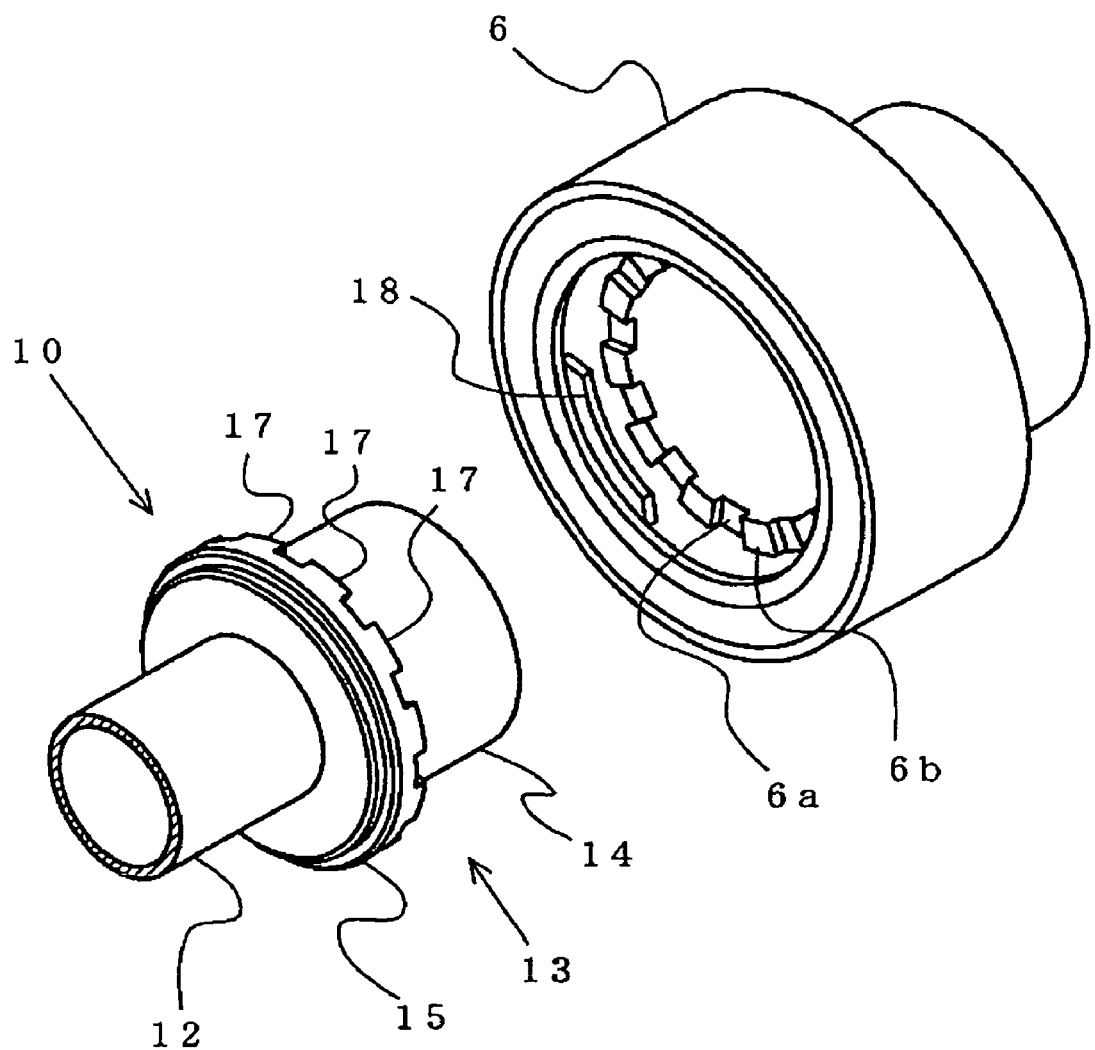
FIG. 3 is a perspective view showing a mounting portion of a core bit the same as that of FIG. 2 and a chuck portion of a concrete drill.

An outer peripheral face of the guide portion 14 remote from an end portion of the mounting portion 13 in a direction of the boring blade 11 is formed with the flange portion 15 in a ring-like shape having an outer diameter larger than an outer diameter of the guide portion 14, and a side face thereof facing other end side of the flange portion 15 in the ring-like shape is formed with the engaging member 16 for transmitting rotation of the chuck portion 6 to the core bit 10. An end surface is disposed on a side of flange portion 15 facing the boring blade 11. The engaging member 16 is formed by a plurality of the engaging projections 17 projected to direct in a direction of the other end side at equal intervals along a circumferential direction at a side face of the flange portion, and rotation on the side of the concrete drill 1 is transmitted to the core bit 10 by engaging the engaging projections 17 with engaging recess portions formed at the chuck portion 6 of the concrete drill 1 as shown in FIG. 3.

Figure 4:
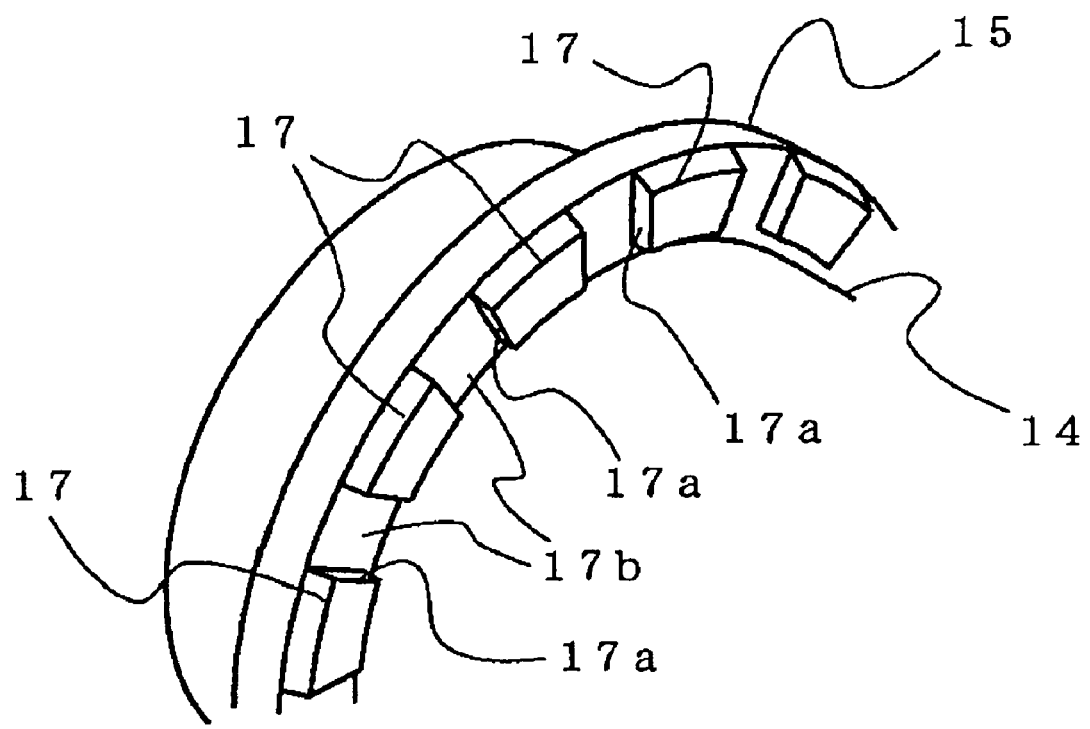
FIG. 4 is a partial perspective view of an engaging member and a flange portion formed at the core bit.
Figure 5:
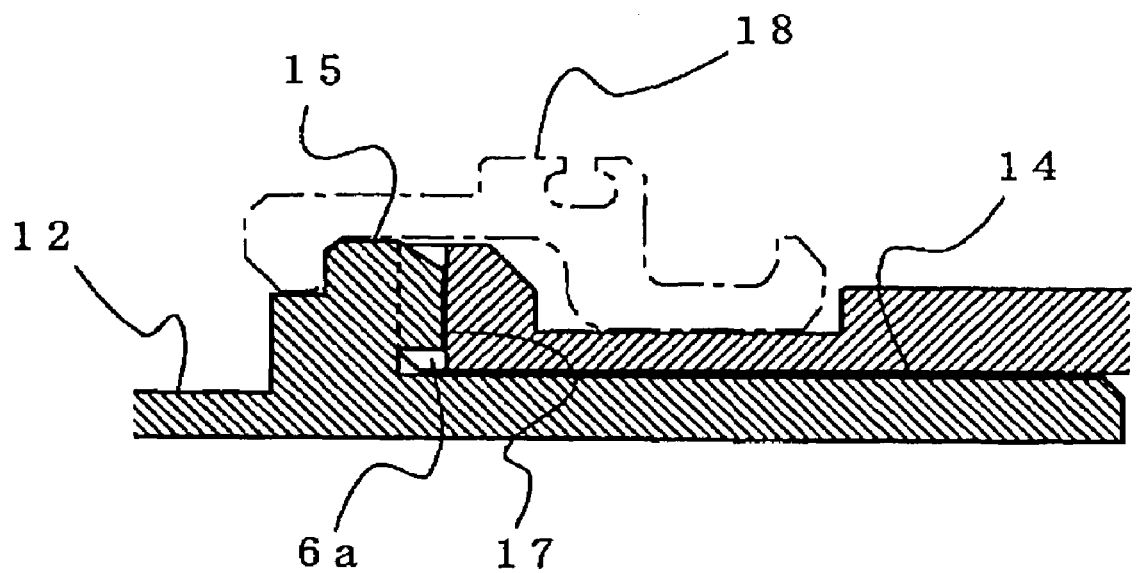
FIG. 5 is a sectional view showing a state of mounting a mounting portion of the core bit and the chuck portion of the concrete drill.

As shown in FIG. 4, a side face of the engaging projection 17 directed in a circumferential direction forms a vertical engaging face 17a, as shown in FIG. 5, the engaging projection 17 is contained at inside of the engaging recess portion 6a formed at the chuck portion 6 of the concrete drill 1, and rotation on a side of the concrete drill 1 by way of the engaging recess portion 6a is transmitted to the core bit 10 via the engaging projection 17 of the core bit 10. Further, vibration in an axial direction of the concrete drill 1 is transmitted to a side of the core bit 10 by bringing a recess portion 17b formed between the engaging projections 17 in contact with a projected portion 6a formed between the engaging recess portions 6a. Further, in a state of mounting the core bit 10 to the chuck portion 6 of the concrete drill 1 by a lock claw member 18 provided at the chuck portion 6 of the concrete drill 1, the concrete drill 1 and the core bit 10 are integrally coupled.

Figure 6:
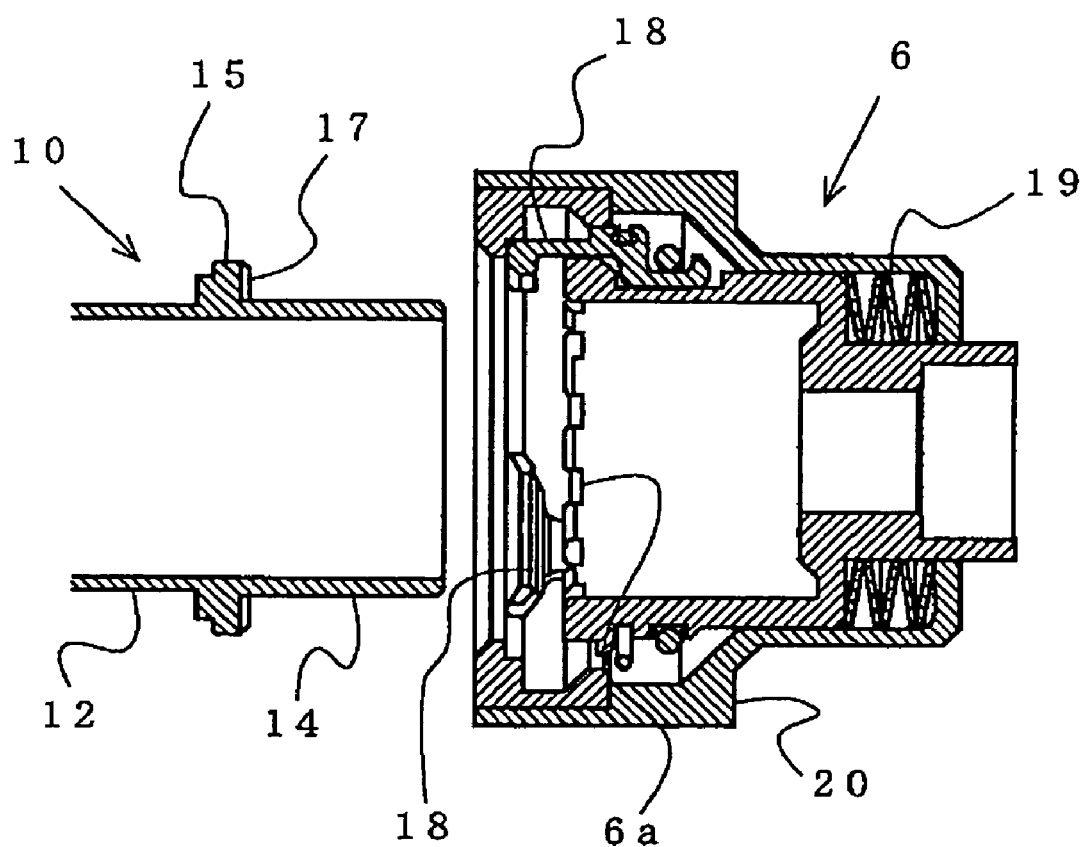
FIG. 6 is a sectional view of a state before mounting the core bit to the chuck portion.
Figure 7:
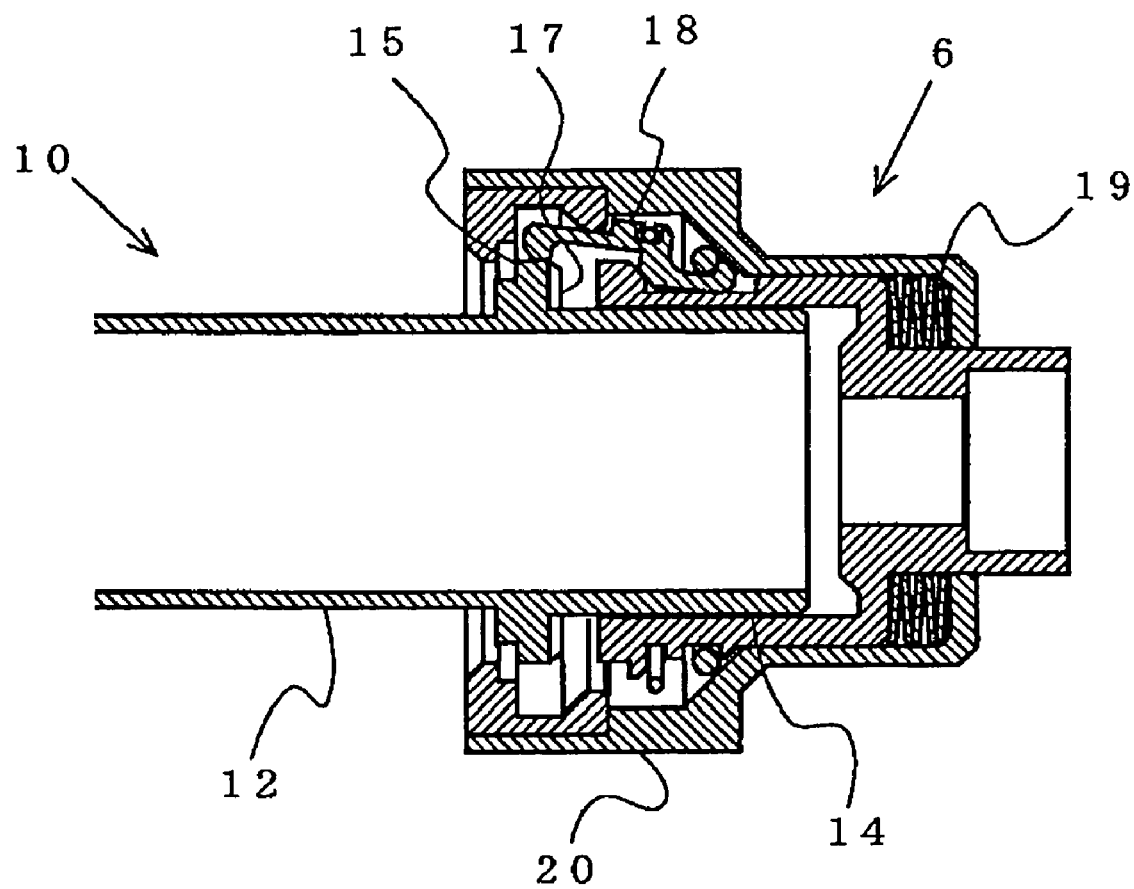
FIG. 7 is a sectional view of a state of a procedure of mounting the mounting portion of the core bit to the chuck portion.
Figure 8:
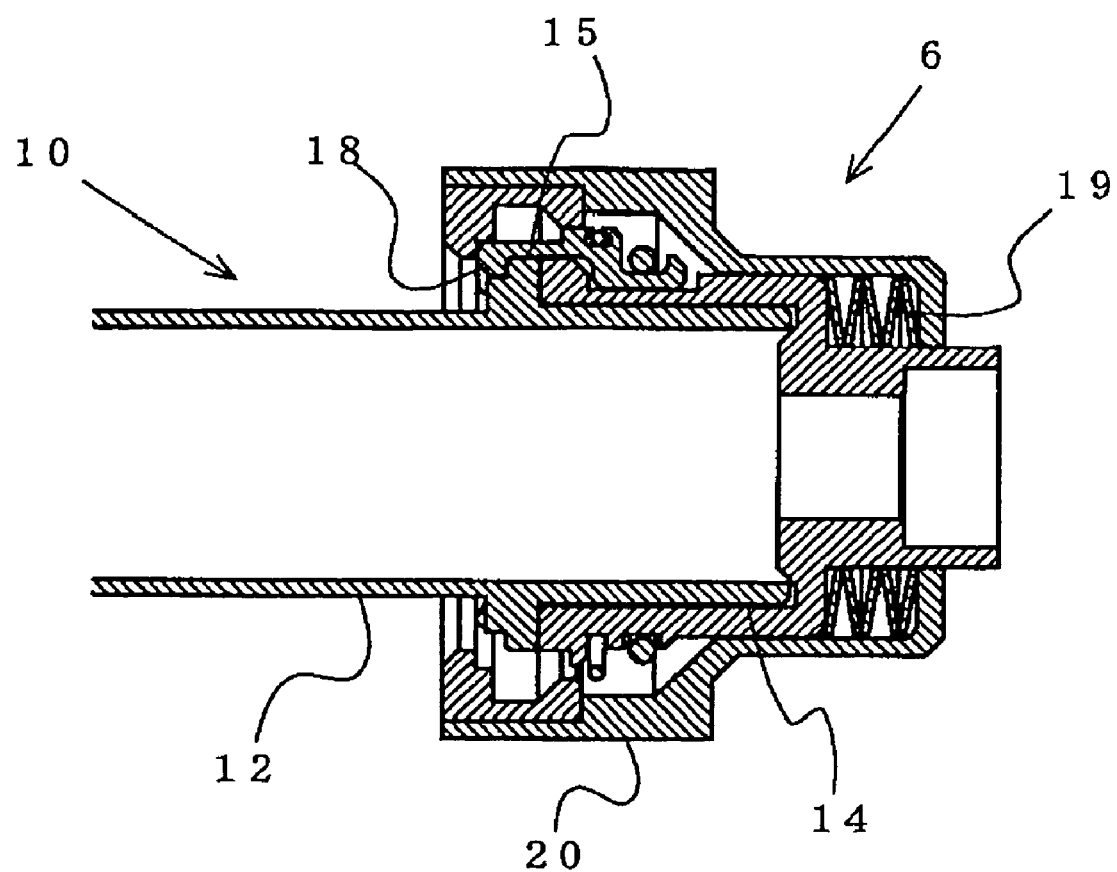
FIG. 8 is a sectional view of a state of mounting the core bit to the chuck portion.

In order to mount the core bit 10 according to the above-described embodiment to the chuck portion 6 of the concrete drill 1, as shown in FIG. 6, the lock claw member 18 locked by an outer cylinder 20 urged rearward by a spring 19 is released from the state of locking the lock claw member 18 by sliding to move frontward the outer cylinder 20 against an urge force of the spring 19. After releasing the state of locking the lock claw member 18 as shown by FIG. 7, by inserting the mounting portion 13 of the core bit 10 into the chuck portion 6, an outer peripheral edge of the flange portion 15 having the large diameter is brought into contact with the lock claw member 18, thereby, the lock claw member is widened and the mounting portion 13 of the core bit 10 can be inserted to a depth portion of the chuck portion 6, further, by fitting the engaging projection 17 of the core bit 10 into the engaging recess portion 6a of the chuck portion by rotating the core bit 10 in a peripheral direction, as shown by FIG. 8, the lock claw member 18 is engaged with the outer peripheral edge of the flange portion 15, further, by moving rearward the outer cylinder 20 by the urge force of the spring 19, the lock claw member 18 is locked and the core bit 10 is mounted to the chuck portion 6 of the concrete drill 1.

As described above, the flange portion 15 having the large diameter is formed at the outer peripheral face of the mounting portion 13 in the cylindrical shape of the core bit 10, a face of the flange portion 15 on a side of an end portion in mounting is formed with the engaging projection 17 projected to the side of the end portion and therefore, the engaging projection 17 exerted with a drive force in a rotational direction from the concrete drill 1 is protected by the outer peripheral edge of the flange portion 15, and the engaging projection 17 can be prevented from being deformed by being brought into contact with other object by dropping or vibrating the core bit 10 in containing or carrying the core bit 10.

Figure 9:
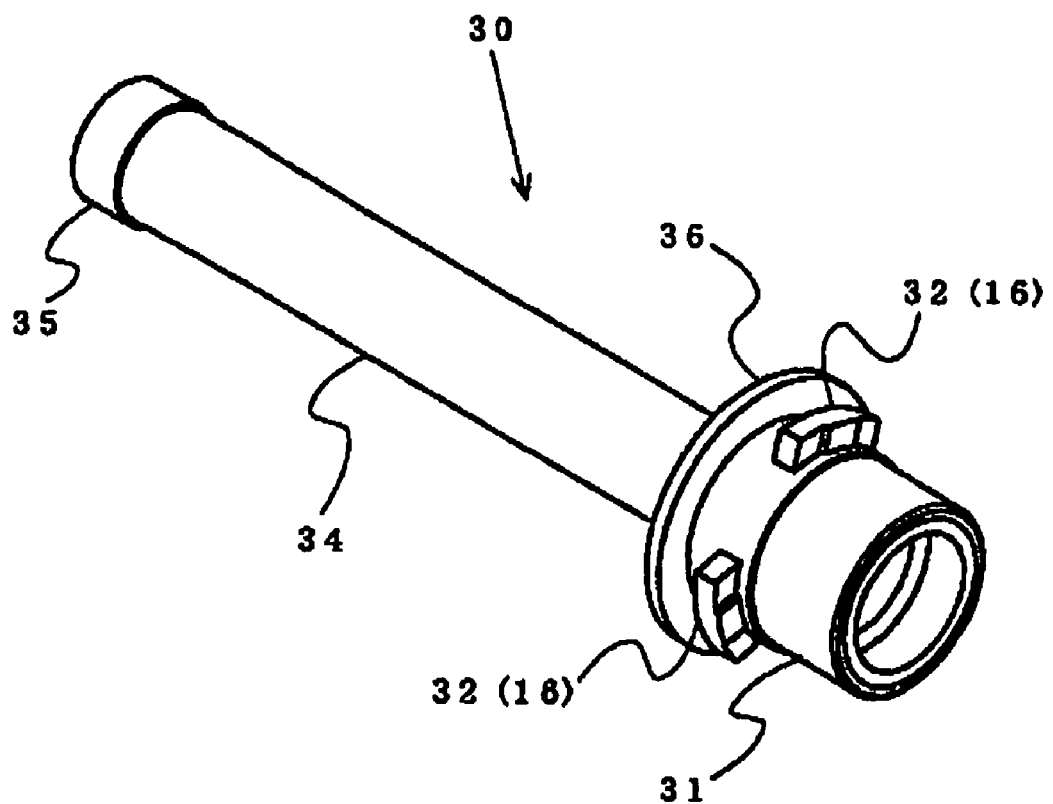
FIG. 9 is a perspective view showing other embodiment of the core bit according to the invention.

FIG. 9 shows the core bit 30 according to other embodiment of the invention, and according to the embodiment, there is shown the core bit capable of being mounted to the chuck portion without changing the shape of the chuck portion of the concrete drill made to be able to mount the core bit shown in the above-described background art. According to the core bit 30 of the embodiment, the engaging member 16 is formed by forming the locking pieces 32 formed to project to direct to an outer side in a radius direction are formed at an outer peripheral face of the mounting portion 31 formed in a cylindrical shape at equal intervals along a circumferential direction. A dimension and an arrangement of the locking pieces 32 are formed to be similar to those of the core bit of the background art. Further, an outer peripheral face of the mounting portion 31 in the cylindrical shape remote from the locking piece 32 to a side of the boring blade 35 formed at an end portion of the drill portion 34 is integrally formed with the flange portion 36 in a shape of a flange an outer diameter of which is larger than a height of projecting the locking piece 32. An end surface is disposed on a side of flange portion 36 facing the boring blade 35.

In this way, by constituting a structure in which the mounting portion 31 formed with the locking piece 32 having a shape the same as that of the background art is formed with the flange portion 36 having the large diameter at the position remote from the locking piece 32 to the side of the boring blade 35, the core bit 30 can be mounted to the chuck portion of the concrete drill of the background art, further, in dropping or containing the core bit 30, the locking piece 32 is protected by the outer peripheral edge of the flange portion 36 and therefore, the locking piece 32 can be prevented from being deformed.

INDUSTRIAL APPLICABILITY

As described above, according to the invention, the outer peripheral face of the mounting portion of the core bit formed with the engaging member for transmitting rotation from the side of the concrete drill is formed with the flange portion having the diameter larger than the outer diameter of the engaging member on the side of the boring blade 5 of the engaging member and therefore, dropping the core bit or bringing the engaging member into contact with a concrete face or other object by vibrating the core bit in containing the core bit is protected by the flange portion, it can be prevented that the engaging member is destructed or deformed and cannot be mounted to the chuck portion of the concrete drill or mounted thereto incompletely and operation can be carried out safely.

The invention claimed is:

1. A core bit for a concrete drill comprising:
    a drill portion in a cylindrical shape;
    a boring blade formed at one end side of the drill portion;
    a mounting portion in a cylindrical shape formed on the other end side of the drill portion;
    an engaging member for engaging with a drill chuck, the engaging member being formed at an outer peripheral face of the mounting portion; and
    a flange portion formed at the outer peripheral face of the mounting portion, disposed on a side of the boring blade of the engaging member and having a diameter larger than an outer diameter of the engaging member and an outer diameter of the drill portion,
    wherein the engaging member comprises a locking piece formed to project from the outer peripheral face of the mounting portion in an outward radial direction, the locking piece configured to prevent movement of the core bit in an axial direction within a chuck, and
    the locking piece includes an end surface on a side of the flange portion, the end surface of the locking piece being perpendicular to an axial direction of the drill portion.

2. The core bit of claim 1, wherein the engaging member further comprises a plurality of engaging projections on a side of the engaging member opposite the drilling direction.

3. The core bit of claim 1, wherein the locking piece comprises a plurality of pieces arranged at equal intervals along a circumferential direction.

* * * * *